C. V. Littlepage,

Saw.

No. 102,286.  Patented Apr. 26, 1870.

Witnesses:
Jno. F. Brooks
Edgar Tate

Inventor:
C. V. Littlepage
PER
Attorneys.

United States Patent Office.

C. V. LITTLEPAGE, OF AUSTIN, TEXAS.

Letters Patent No. 102,286, dated April 26, 1870.

IMPROVEMENT IN SAWS.

The Schedule referred to in these Letters Patent and making part of the same.

*To all whom it may concern:*

Be it known that I, C. V. LITTLEPAGE, of Austin, in the county of Travis and State of Texas, have invented a new and useful Improvement in Saws; and I do hereby declare that the following is a full, clear, and exact description thereof, which will enable others skilled in the art to make and use the same, reference being had to the accompanying drawings forming part of this specification.

The nature of my invention consists in constructing one or more of the teeth which are formed on the saw plate with a beveled edge, and with a concave side, such concave being formed on a slightly spiral line, this mode of constructing these teeth making them shorter than the others, and also throwing their points into the same, or nearly the same, plane with the sawing-teeth, while their intermediate portion stands out of such plane, in a manner to plane with a drawing-cut, and provide a free escape for the shavings, all as hereinafter described, and as shown in the drawings.

Similar letters of reference indicate corresponding parts.

Figure 1:
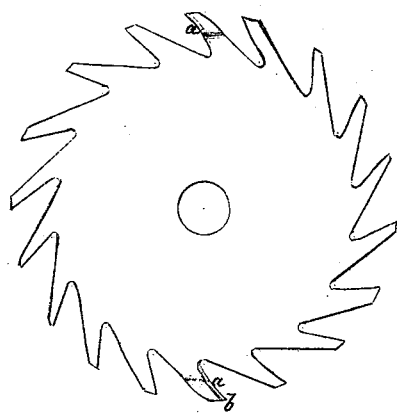
Figure 1 is a side elevation of a circular saw, constructed according to my improvement.
Figure 3:
Figure 3 is a side elevation of a reciprocating saw, similarly arranged.
Figure 2:
Figure 2 is a section of the same.
Figure 4:
Figure 4 is a front elevation of the same.

In carrying out my invention, as applied to circular saws, I bend one or more teeth to each side on a curved line, as shown at A A, so as to project laterally slightly more than the set of the ordinary teeth, and I bevel the said teeth obliquely on the sides *a*, so as to give them an edge-bearing against the surfaces of the lumber similar to the ordinary rotary edging or planing tools, whereby I plane off the rough surface left by the ordinary cutting-teeth, not only making them smooth, but removing the spongy projecting fibers which commonly bear against the saw, creating friction and heat. I prefer to arrange these teeth opposite each other, but they may be otherwise placed, if preferred. I find in practice that one planing-tooth for each side is sufficient, but in some cases I may use four or more, according to circumstances.

The points *b* of these teeth are bent backward and toward the plane of the saw-plate, to prevent them from acting on the surfaces to be planed, to roughen or scratch the same:

The application of this improvement to reciprocating saws is the same, except that the planing-teeth should be placed at or about the center thereof, lengthwise, in order to work across the whole surface cut.

I am well aware that planing and smoothing-teeth for saws are not new; but, so far as I am aware, saws provided with such teeth have failed to come into general use, in consequence of the imperfection of their construction. My invention has been in practical use for a considerable time, and has amply demonstrated its perfect adaptation to the purpose intended.

I do not claim the construction of saw-plate with planing-teeth, as shown in the patents granted to S. Ustick, August 11, 1832, and Ira S. Brown, January 8, 1861; but What I do claim as my invention, and desire to secure by Letters Patent, is—

The tooth or teeth A A formed on the saw-blade, when such tooth or teeth are constructed and arranged in relation to ordinary sawing-teeth, as herein described and shown.

The above specification of my invention signed by me this 4th day of November, 1869.

C. V. LITTLEPAGE.

Witnesses:
GEO. W. MABEE,
ALEX. F. ROBERTS.